UNITED STATES PATENT OFFICE.

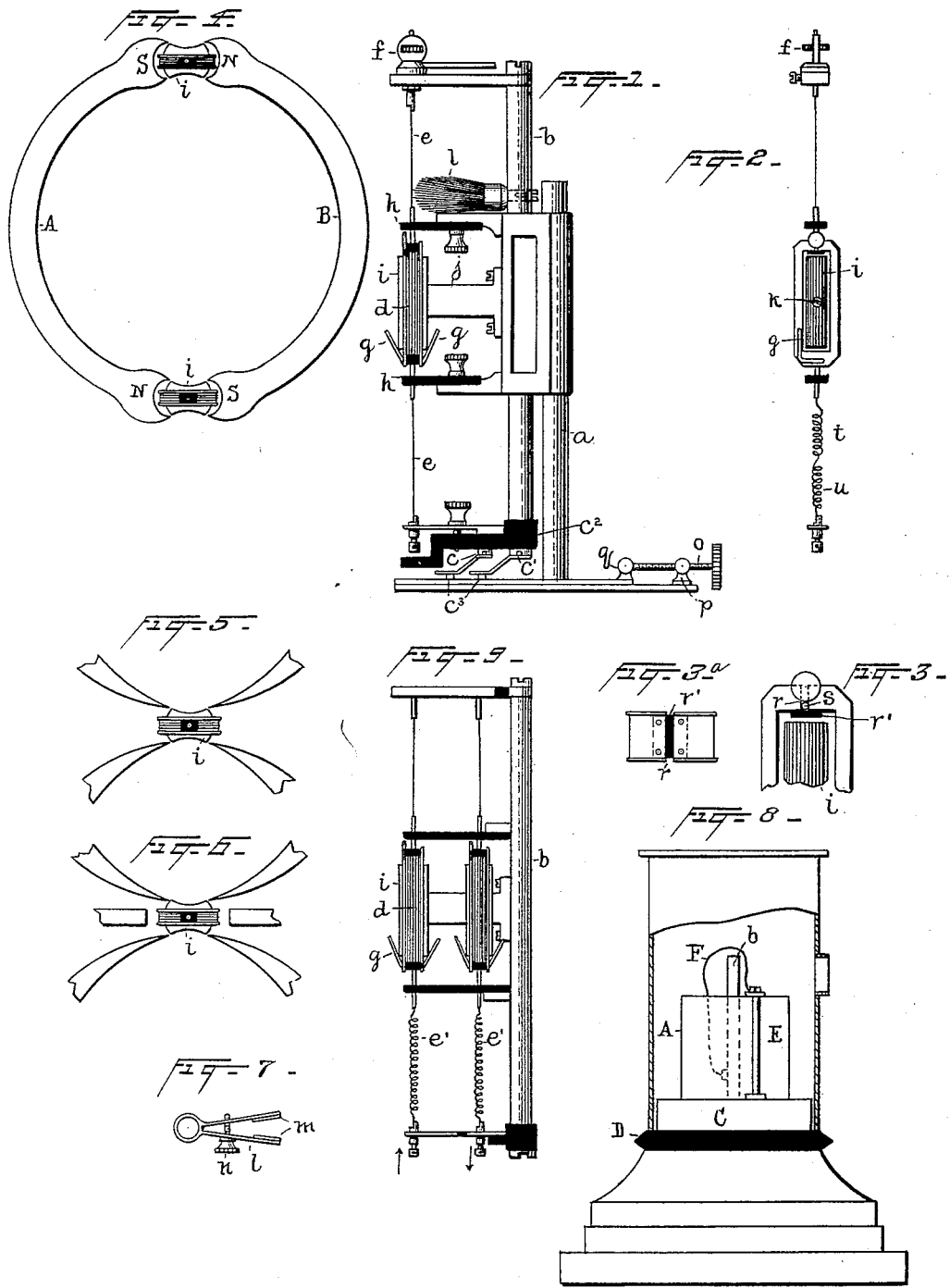

HERBERT WATSON SULLIVAN, OF LONDON, ENGLAND.

ELECTRICAL MEASURING INSTRUMENT.

SPECIFICATION forming part of Letters Patent No. 602,527, dated April 19, 1898.

Application filed November 6, 1896. Serial No. 611,308. (No model.)

*To all whom it may concern:*

Be it known that I, HERBERT WATSON SULLIVAN, a subject of the Queen of Great Britain, residing at London, England, have invented a certain new and useful Improvement in Electrical Measuring and Signaling Instruments, of which the following is a specification.

My improvement relates to electrical instruments operating on the suspended-coil principle, and by my improvements, hereinafter to be explained, a higher figure of merit is obtained than has heretofore been possible with any of the existing galvanometers, siphon-recorders, or other instruments of this type for the same coil convolutions, and my instruments are also especially adapted for use on shipboard, as by my improvements I have overcome or eliminated the disturbing oscillations due to the rolling and pitching movements of the vessel, which heretofore practically prevented the use of such instruments on shipboard.

More particularly my objects are to obtain a more concentrated field of magnetic force and consequently greater deflecting moment. This I obtain by so shaping the magnet as to obtain the greatest possible amount of concentration. This is accomplished by so shaping the pole-pieces of the magnet as to bring them into close proximity to the usual soft core employed and preferably so close that the thickness of a thin sheet of paper, such as tissue-paper, will about equal the space between the pole-pieces and said core; also, by using a core which is not of the usual cylindrical shape, but which has portions cut away, as hereinafter explained, I aid in concentrating the field of magnetic force. In carrying out this part of my invention but two pole-pieces, as is usual, may be employed. In that case the pole-pieces will be cut away at one point, so as to afford room for the coil to oscillate, while other points are brought into close proximity to the core, so as to reduce the air-gap. Four pole-pieces also may be employed, and in this case I prefer to have knife-edge pole-pieces which can be brought into close proximity to the coil, the coil being free to work between the knife-edges of the pairs. So, also, six pole-pieces might be employed, the center pole-piece being retracted to allow motion of the coil, and the outer poles having knife-edges in close proximity to the core of the coil. I secure also by attaching permanently to the core a light arm or arms of diamagnetic material a ready method of effecting a true balance of the coil, the necessity for which is well known, as however carefully the coil may be wound and suspended it inevitably is out of balance and requires balancing, so that the rolling of a ship or jarring motion will not affect the same. With the permanent arm or arms attached by me the balance is effected in a comparatively short time and very readily without the aid of any special tools or apparatus independent of the coil itself and without even removing the coil suspension from the instrument. I also, by providing a suitable damping arrangement which is so mounted as to be used or not, as desired, enable the instrument to have a wider range of usefulness than otherwise is possible. I also provide for the adjustment of the coil suspension-frame in relation to the magnet from the outside of the containing case and for the removal of such frame, so that the sensibility may be varied at will without removing the cover of the instrument, and in case of accident the suspension-frame may be readily changed in a few seconds.

By thoroughly insulating the magnet and connecting same with the coil by a small wire the static-charge effect experienced in galvanometers having a suspended coil, due to the coil and magnet and other metallic parts forming a Leyden or air condenser, especially when measuring high voltages, is obviated.

To eliminate the effect of sudden impulses due to earth influences, especially in the vicinity of electric railways, &c., I arrange two coils so that the current passes through them in reverse directions—that is, the coils are arranged in series. Sudden impulses will deflect the coils in opposite directions, and thus the momentary current induced in the one coil by its movement will counteract that induced in the other coil; but for steady currents neither coil will be affected by the other.

By employing two magnets, preferably semicircular in shape, and two coil systems I produce an instrument which is made to serve a double purpose. The magnets are so placed in relation to each other that they form two independent and oppositely-directed fields, the north pole of one magnet and the south pole of the other inclosing one field and the south pole of the first-mentioned magnet and the north pole of the latter similarly inclosing the other, with an independent coil system working in each. This arrangement affords all the advantages of two independent instruments in one.

In the accompanying drawings, forming part of this specification, Figure 1 is a side elevation of a coil frame or standard embodying my improvements. Fig. 2 is a face view of the coil mounted somewhat differently from the mode shown in Fig. 1. Fig. 3 is an enlarged view of a portion of the coil-frame embodying my improvements. Fig. $3^a$ is a bottom plan view of the upper cross-piece of the frame. Figs. 4, 5, and 6 show various arrangements of the magnets relatively to the coil and its core, which will be explained more in detail hereinafter. Fig. 7 is another form of damping device. Fig. 8 is a side elevation, mainly diagrammatic, of a complete instrument, showing a method of connecting together the coil and insulated magnet. Fig. 9 is a side elevation, with many parts omitted, of a double-coil apparatus.

$a$ is a standard, upon which slides the coil-frame $b$. The lower end of the frame $b$ is provided with contact-points $c\,c'$, mounted on insulation $c^2$, which contact-points make connection with the permanent electrical conductors $c^3\,c^3$. When, therefore, the suspension-frame is slid down on its upright $a$, contact will be made with the permanent electrical connections of the instrument, the frame, which is of metal, being in the circuit and properly insulated from the standard $a$. The permanent conductors $c^3$ are insulated from each other, and the contact-points $c\,c'$ are preferably so connected that when contact is made with $c^3$ the suspension-wires $e\,e$ are made conductors through the coil, the circuit being completed by the coil-frame $b$.

The coil $d$ is suspended, as shown in Fig. 1, by means of light metallic wires $e\,e$, the torsion of which is controlled by the torsion-heads $f$. Sometimes by substituting for the straight bottom suspension-wire $a$ (shown in Fig. 1) a fine wire spiral, as shown at $e'\,e'$, Fig. 9, the rigidity of control of the instrument is decreased, and thereby an increase of sensibility is effected. Said coil is provided with an arm or arms $g$ of any suitable light non-oxidizable diamagnetic metal—as, for instance, alumina, brass, or lead. By the addition of these permanent arms any want of balance is compensated for, the coil being readily balanced with the least possible addition to its weight. Projecting from the standard are arms $h\,h$ of insulating material, through which the pins connecting the suspension-wires $e$ with the coil pass. These arms are provided with openings somewhat larger than the diameter of the pins. This is especially useful on shipboard, where when the ship rolls or pitches the bearing will take the weight of the coil, thus keeping it practically within a straight line and preventing all injurious strain on the suspension-wires. So, also, these arms $h\,h$ will serve to support the coil in case the suspension breaks, as the pins are of sufficient length to hold the coil in the arms $h$ should the suspension give way and thereby prevent the coil from falling out and sustaining damage.

The core $i$ of soft metal is supported from the standard by the arm $j$, which rigidly connects said core by the pin $k$, Fig. 2. This core I prefer to shape as shown in Fig. 4, so as to concentrate the magnetic rays at the center.

$l$ is a damping device, shown in Fig. 1 as a camel's-hair brush, with a suitable adjustment to and from the suspension-wire $e$. In Fig. 7 the damping device is shown as a clamp, having a facing $m$ of some soft yielding material, as plush, with a screw $n$ regulating the pressure exerted. In order to secure a horizontal adjustment of the suspension-frame from the outside of the casing of the instrument, I pass a screw $o$ through a stationary screw-cut post $p$ to a movable post $q$ on the base of the standard. It will be obvious that by turning the screw $o$ the standard and its mechanism is given a corresponding movement from the outside of the case.

The frame on which I wind the coil is preferably of alumina of the shape shown in Fig. 2 in front view, the coil being wound between the flanges thereof. Preferably I form the coil of a copper foil or tape, having preferably the width of the space between the flanges of the frame, each layer of the tape being separated by a paper insulation from its adjacent layers. By this arrangement the resistance is reduced and the size and weight are diminished, as less space is taken up by the insulating material.

In order to regulate the electromagnetic damping effect of the metallic frame on which the coil is wound, I have shown in Fig. 3 the frame as divided at $r$, the division being bridged by insulation $r'$, with a sliding piece or pin $s$, of conducting material for bringing the divisions of the frame into greater or less contact.

In order to remedy viscosity and torsional error in the suspending-wires and secure the return of the coil to the exact position from which it started when deflected, I find that at times it will be advantageous to employ a wire, which may be the conductor, which is wound in reverse spirals, as shown at $t$ and $u$. By this means the control of the suspending-wires is made constant, with deflections of different amplitudes and opposite directions.

Referring now to Fig. 4, in which the arrangement of magnets and coils for use in an instrument designed for a double use is shown, the magnet A has its north pole opposite the south pole of the magnet B, while the magnet B has its north pole opposite the south pole of the magnet A. By this arrangement either coil system may be used, and should one break there is always a second one at hand, and a further advantage is that the second coil may be used as a dummy to eliminate the disturbing influences of the earth potential, as explained in connection with Fig. 9. The pole-pieces of the magnets, it will be noticed, are cut away, so as to permit free oscillation of the coil, while the outer edges of the pole-pieces are brought into close proximity to the core $i$, so as to concentrate the field thereon. This concentration of field is further secured by elongating the core, preferably by giving it the shape shown in the drawings.

In Fig. 5 I have shown a single coil system with two magnets arranged in connection therewith. Both of these magnets are brought down to a knife-edge and into close proximity to the core $i$, the coil having ample space to oscillate between the said knife-edges, as shown.

In Fig. 6 I have shown three magnets, the two outer ones being similar to those shown in Fig. 5, while a third magnet is arranged between them in such a way as to leave room for the oscillation of the coil. By these several arrangements of magnets a highly-concentrated field is secured.

In Fig. 8 I have shown the apparatus constructed to overcome the static-charge action set up between the coil and the magnet and other metallic parts. This is done by mounting the magnet A, which, for convenience of consideration, may be taken as the ordinary C-magnet, upon the usual wooden support C, which support in turn is mounted upon a block of vulcanite or other well-approved insulation D, which is so shaped as to expose a beveled edge, which may be conveniently wiped without opening the case by a cloth to decrease surface leakage. The magnet is held in place by the usual clamp E, which is connected by a light metallic conducting-wire F with the metallic suspension-frame $b$, carrying the suspended-coil system.

In Fig. 9 I have shown two coil systems, which are connected in series, whereby the disturbing influences existing in the vicinity of electric apparatus and circuits is overcome. The circuit is sufficiently shown by the arrows and the insulation represented by the solid lines.

I claim—

1. An electrical instrument having in combination an oscillating coil, a core therefor and magnets in whose field the coil oscillates, having poles with pointed extremities brought into close juxtaposition with portions of the core without interfering with the movement of the coil, substantially as set forth.

2. An electrical instrument having in combination an oscillating coil suspended from an insulating-support, a fixed core therefor, and magnets between which said coil oscillates, having poles with pointed extremities brought into close juxtaposition with the core without interfering with the movement of said coil about the core, substantially as set forth.

3. In an electrical instrument, the combination with an oscillating coil, of an adjustable weight permanently fixed to such coil, substantially as set forth.

4. In an electrical instrument, the combination of an oscillating coil, and an arm of diamagnetic material permanently fixed to said coil, substantially as set forth.

5. In an electrical instrument provided with a suspended oscillating coil, an adjustable mechanical damping device adapted to contact with the suspension wire or thread, substantially as set forth.

6. In an electrical instrument provided with a suspended oscillating coil, the combination therewith of a camel's-hair brush adapted to contact with the suspension wire or thread, substantially as set forth.

7. In an electrical instrument, the combination with a suspension-coil, of a frame sustaining the same, and means for adjusting the frame longitudinally, substantially as set forth.

8. In an electrical instrument, the combination with a suspension-coil, of a frame sustaining the same, and a standard upon which said frame is adapted to be moved vertically, substantially as set forth.

9. In an electrical instrument, a suspension-coil provided with a divided frame upon which the conductor is wound, and means for connecting the divided portions, substantially as set forth.

10. In an electrical measuring instrument, the combination of two suspended oscillating coils connected in series, substantially as set forth.

11. In an electrical measuring instrument, the combination of a permanent magnet, having poles with pointed extremities brought into close juxtaposition with portions of the core of an oscillating coil in such manner as not to interfere with the movement of such coil; a freely-oscillating coil suspended between the poles of said magnet, a core in position within said oscillating coil, a case for inclosing said magnet, coil and core, and means for adjusting the instrument from without the case, substantially as set forth.

12. In an electrical measuring instrument, the combination of two suspended oscillating coils connected in series and having cores therefor, with magnets arranged so that their poles form two independent and oppositely-directed fields in one of which each of said coils is suspended, substantially as set forth.

13. In an electrical measuring instrument, the combination of two coils in series oscillating about cores, with magnets with poles arranged to form two independent and oppositely-directed fields in one of which each of said coils oscillates, said poles being cut away to permit the free oscillation of the coils while having their pointed extremities in close juxtaposition to the cores of the coils, for the purpose substantially as set forth.

14. In an electrical measuring instrument, the combination of a support with an oscillating coil suspended therefrom, having a pin projecing from top and bottom of said coil; and slotted arms above and below said coil receiving said pins in their slots, for the purpose substantially as set forth.

15. In an instrument for recording electrical measurement by the oscillation of a suspended coil, the combination of a coil and core therefor; a magnet insulated from its support, and having poles in whose field the coil oscillates, and an electrical connection between said coil and said magnets, for the purpose substantially as set forth.

This specification signed and witnessed this 28th day of October, 1896.

HERBERT WATSON SULLIVAN.

Witnesses:
 EUGENE CONRAN,
 JNO. R. TAYLOR.